(12) United States Patent
Dyckmans et al.

(10) Patent No.: US 11,992,978 B2
(45) Date of Patent: May 28, 2024

(54) PROCESSING A THERMOPLASTIC TEXTILE

(71) Applicant: adidas AG, Herzogenaurach (DE)

(72) Inventors: Clemens Dyckmans, Erlangen (DE); Florian Fick, Nuremberg (DE)

(73) Assignee: adidas AG, Herzogenaurach (DE)

( * ) Notice: Subject to any disclaimer, the term of this patent is extended or adjusted under 35 U.S.C. 154(b) by 402 days.

(21) Appl. No.: 16/815,652

(22) Filed: Mar. 11, 2020

(65) Prior Publication Data

US 2020/0290244 A1 Sep. 17, 2020

(30) Foreign Application Priority Data

Mar. 11, 2019 (DE) .......................... 102019203267.2

(51) Int. Cl.
| | | |
|---|---|---|
| *B29C 43/36* | (2006.01) | |
| *A43B 1/14* | (2006.01) | |
| *B29C 43/20* | (2006.01) | |
| *B29C 43/42* | (2006.01) | |

(52) U.S. Cl.
CPC ............ *B29C 43/36* (2013.01); *B29C 43/203* (2013.01); *A43B 1/14* (2013.01); *B29C 2043/425* (2013.01)

(58) Field of Classification Search
CPC ......... B29C 43/203; B29C 59/02; B44C 1/24; B29K 2105/0809; B29K 2105/0854
See application file for complete search history.

(56) References Cited

U.S. PATENT DOCUMENTS

| | | | |
|---|---|---|---|
| 2,047,373 A | | 7/1936 | Kingsley |
| 2,815,306 A | * | 12/1957 | Wassermann ........ B29D 35/122 |
| | | | 264/293 |
| 3,443,281 A | | 5/1969 | Walby |

(Continued)

FOREIGN PATENT DOCUMENTS

| | | | | |
|---|---|---|---|---|
| DE | | 1957727 | 6/1970 | |
| DE | 102009009256 B4 | * | 6/2012 | ............... E04B 1/86 |

(Continued)

OTHER PUBLICATIONS

Chinese Patent Application No. 202010146017.3, Office Action dated Aug. 6, 2021, 19 pages (English machine translation submitted).

(Continued)

*Primary Examiner* — Jerzi H Moreno Hernandez

(74) *Attorney, Agent, or Firm* — Kilpatrick Townsend & Stockton LLP

(57) ABSTRACT

A method for generating a pattern of indentations in a surface of a thermoplastic textile includes processing the thermoplastic textile with a mold comprising at least one subunit adapted to create at least one subpattern of the pattern, wherein the at least one subunit is at least one of exchangeable or reconfigurable; fusing at least one indentation of the pattern of indentations into the thermoplastic textile by applying heat and pressure; and exchanging the at least one subunit with a second at least one subunit or reconfiguring a spatial arrangement of a footprint of the at least one subunit within the mold from a first spatial arrangement to a second spatial arrangement, wherein a footprint of the at least one subunit is different than a footprint of the second at least one subunit.

20 Claims, 5 Drawing Sheets

(56) References Cited

U.S. PATENT DOCUMENTS

| | | | | |
|---|---|---|---|---|
| 3,616,159 A * | 10/1971 | Kamp | ................... | D04H 1/736 428/152 |
| 3,946,195 A | 3/1976 | Lyons et al. | | |
| 4,078,124 A * | 3/1978 | Prentice | ................... | D04H 1/56 156/290 |
| 4,902,366 A * | 2/1990 | Bader | ...................... | D04H 1/54 156/181 |
| 5,164,255 A | 11/1992 | Weeks | | |
| 6,093,665 A | 7/2000 | Sayovitz et al. | | |
| 2001/0055684 A1 * | 12/2001 | Davis | ................... | B29C 33/306 428/379 |
| 2005/0101215 A1 | 5/2005 | Bernstein et al. | | |
| 2008/0196607 A1 * | 8/2008 | Rinko | ................... | B29C 59/02 101/32 |
| 2010/0199520 A1 * | 8/2010 | Dua | ................... | A43B 23/0265 264/293 |
| 2012/0175813 A1 * | 7/2012 | Leedy | ................... | B30B 15/34 264/293 |
| 2013/0220570 A1 * | 8/2013 | Sears | ....................... | B22C 9/10 164/34 |
| 2018/0154555 A1 | 6/2018 | Ames | | |
| 2018/0216290 A1 * | 8/2018 | Feng | ................ | D06C 23/04 |
| 2018/0290371 A1 * | 10/2018 | Kappes | ................ | B29C 59/025 |
| 2020/0063311 A1 * | 2/2020 | Hong | ...................... | B29C 59/02 |
| 2021/0073493 A1 * | 3/2021 | Polosa | ................... | D04H 13/00 |
| 2021/0229345 A1 * | 7/2021 | Blackwell | ............... | B29C 59/04 |
| 2022/0040907 A1 * | 2/2022 | Beenken | ................ | B29C 59/02 |

FOREIGN PATENT DOCUMENTS

| | | |
|---|---|---|
| EP | 0121299 | 10/1984 |
| EP | 0300435 | 1/1989 |
| EP | 2453038 | 5/2012 |
| EP | 2488685 | 8/2012 |
| EP | 2952318 | 12/2015 |
| EP | 3129159 | 2/2017 |
| EP | 2397320 | 5/2017 |
| WO | 03082550 | 10/2003 |
| WO | 2018112144 | 6/2018 |
| WO | 2019115875 | 6/2019 |

OTHER PUBLICATIONS

European Patent Application No. 20162390.7, Office Action dated Oct. 8, 2021, 7 pages.

Chinese Application No. 202010146017.3, Office Action dated Jan. 12, 2022, 16 pages (7 pages of Original Document and 9 pages of English Translation).

Chinese Application No. 202010146017.3, Office Action dated Apr. 29, 2022, 14 pages (5 pages of Original Document and 9 pages of English Translation).

German Patent Application No. 102019203267.2, Office Action dated Nov. 13, 2019, 14 pages (English machine translation provided).

European Patent Application No. 20162390.7, European Search Report dated Jul. 28, 2020, 10 pages.

German Patent Application No. 102019203267.2, Office Action dated Jun. 7, 2022, 10 pages (English machine translation provided).

Office Action, European Patent Application No. 20162390.7, dated Aug. 2, 2023, 6 pages.

* cited by examiner

PROCESSING A THERMOPLASTIC TEXTILE

CROSS REFERENCE TO RELATED APPLICATION

This application is related to and claims priority benefits from German Patent Application No. DE 10 2019 203 267.2, filed on Mar. 11, 2019, entitled "MOLD, METHOD, AND SYSTEM FOR PROCESSING A THERMOPLASTIC TEXTILE" ("the '267.2 application"). The '267.2 application is hereby incorporated herein in its entirety by this reference.

FIELD OF THE INVENTION

The present invention relates to a reconfigurable mold for processing a thermoplastic textile as well as to a method and system using such a mold.

BACKGROUND

Modern molding techniques for thermoplastic textiles, and in particular non-woven fabrics, have successfully been applied to many different aspects of at least one of apparel or sporting goods manufacturing. For instance, reference document EP 2 397 320 B1 discloses several aspects of at least one of molding or fusing non-woven fabrics used in at least one of the apparel or shoe industry. Specifically, EP 2 397 320 B1 provides a method for texturing a thermoplastic non-woven fabric in a heat press mold (e.g. c.f. FIG. 45A-45C and paragraph [0116]).

Additional references relevant for the technical background of the present disclosure are provided by EP 0 121 299 A2 and U.S. Pat. No. 5,164,255 A.

Such conventional techniques allow for providing thermoplastic textiles with at least one fused, embossed, or debossed patterns in order to obtain at least one of an improved stretch resistance, improved water resistance, or improved aesthetics. Such fusing may be done with heat presses or with lasers. Heat presses are better for large batches, allow for 3D-effects, and are cheaper in production.

However, the molding techniques and the molds known from the references have various disadvantages. For instance, the conventional molds used in the references are bulky and inflexible. In particular, they lack the capabilities to be quickly adapted for at least one of processing of new kinds of textiles or providing the processed textiles with at least one of new or variable at least one of structural or aesthetic properties. In other words, a new mold must typically be designed and manufactured before a new type of textile may be molded. Evidently, this process is at least one of slow, expensive, or wasteful.

It is therefore the problem underlying the present disclosure to improve the conventional molding techniques, molds, and systems for processing thermoplastic textiles so that the above outlined disadvantages of the references are at least partly overcome.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a mold for generating a pattern of indentations in a surface of a thermoplastic textile comprises at least one subunit adapted to create at least one subpattern of the pattern, wherein the at least one subunit is at least one of exchangeable or reconfigurable.

In some embodiments, the at least one subunit comprises a footprint that is configured to form a tessellation.

The mold, in certain embodiments, comprises a plurality of the at least one subunit each of the at least one subunit comprising substantially the same footprint.

In certain embodiments, a spatial arrangement of the at least one subunit is reconfigurable within the mold.

The mold, in some embodiments, is further adapted to fuse at least one indentation of the pattern of indentations into the thermoplastic textile by applying at least one of heat or pressure and configured to provide the at least one fused indentation with a fused outer edge region comprising at least one of a smoothly decreasing density, a smoothly decreasing degree of fusing, or a smoothly decreasing degree of compression.

In some embodiments, the at least one fused indentation comprises a plurality of regularly arranged indentations.

In certain embodiments, the at least one indentation is substantially transparent.

The mold, in some embodiments, is further adapted to provide at least one indentation of the pattern of indentations with a minimal area of larger than or equal to 2 $mm^2$ and smaller than or equal to 30 $cm^2$.

The at least one subunit, in some embodiments, comprises at least one connection element configured to connect the at least one subunit to another subunit adapted to create another subpattern of the pattern.

The at least one subunit, in certain embodiments, is adapted to provide the at least one subpattern with different properties than a different portion of the pattern, wherein the different properties comprise at least one of a mechanical property or an optical property.

In certain embodiments, the mold further comprises a heating device for heating at least one of the thermoplastic textile, a surface of the mold, or a surface of the at least one subunit.

According to certain embodiments of the present invention, a method for generating a pattern of indentations in a surface of a thermoplastic textile comprises processing the thermoplastic textile with a mold comprising at least one subunit adapted to create at least one subpattern of the pattern, wherein the at least one subunit is at least one of exchangeable or reconfigurable.

The method, in some embodiments, further comprising at least one of: exchanging the at least one subunit of the mold; reconfiguring the at least one subunit of the mold; producing the at least one subunit with a rapid prototyping device prior to processing the thermoplastic textile; modifying the at least one subunit with the rapid prototyping device prior to processing the thermoplastic textile; inserting a separator material between the thermoplastic textile and at least one of a surface of the mold or the at least one subunit; or applying a release agent to at least one of the surface of the mold or the at least one subunit.

The method, in certain embodiments, wherein at least one of: a processing temperature of a portion of the mold is larger than or equal to 70° C. and smaller than or equal to 220° C.; an ambient temperature is larger than or equal to 170° C. and smaller than or equal to 190° C.; a processing time is larger than or equal to 3 s and smaller than or equal to 150 s; or a processing pressure is larger than or equal to 0.2 bar and smaller than or equal to 5 bar.

In some embodiments, the method comprises forming a piece of apparel using the thermoplastic textile, wherein the piece of apparel comprises a shoe.

In certain embodiments, the thermoplastic textile comprises a non-woven fabric or a pre-joined composite material and at least one layer of a reinforcement textile, wherein the non-woven fabric and the pre-joined composite material comprises at least one layer of melt blown non-woven fabric, and wherein the piece of apparel comprises at least one fused indentation.

The at least one fused indentation, in some embodiments, comprises an outer edge region comprising at least one of a smoothly decreasing density, a smoothly decreasing degree of fusing, or a smoothly decreasing degree of compression.

According to certain embodiments of the present invention, a system for processing a thermoplastic textile comprises: a mold comprising at least one subunit adapted to create at least one subpattern of a pattern, wherein the at least one subunit is at least one of exchangeable or reconfigurable; and a device for at least one of exchanging or reconfiguring the at least one subunit.

The device for at least one of exchanging or reconfiguring the at least one subunit, in some embodiments, comprises a robotic actuator configured to grip and translate the at least one subunit.

The system for processing the thermoplastic textile, in some embodiments, further comprises at least one of: a device for automatically forming the thermoplastic textile to be processed; a device for heating at least one of the mold, the at least one subunit, or the thermoplastic textile being processed; a device for storing a plurality of the at least one subunit; a rapid prototyping device for at least one of producing or modifying the at least one subunit on demand prior or during system operation; a device for inserting a separator material at least one of between the thermoplastic textile and a surface of the mold or between the thermoplastic textile and a surface of the at least one subunit; or a device for applying a release agent to at least one of the surface of the mold or the surface of the at least one subunit.

BRIEF DESCRIPTION OF THE DRAWINGS

In the following detailed description, embodiments of the invention are described referring to the following figures.

BRIEF DESCRIPTION

Figure 1:
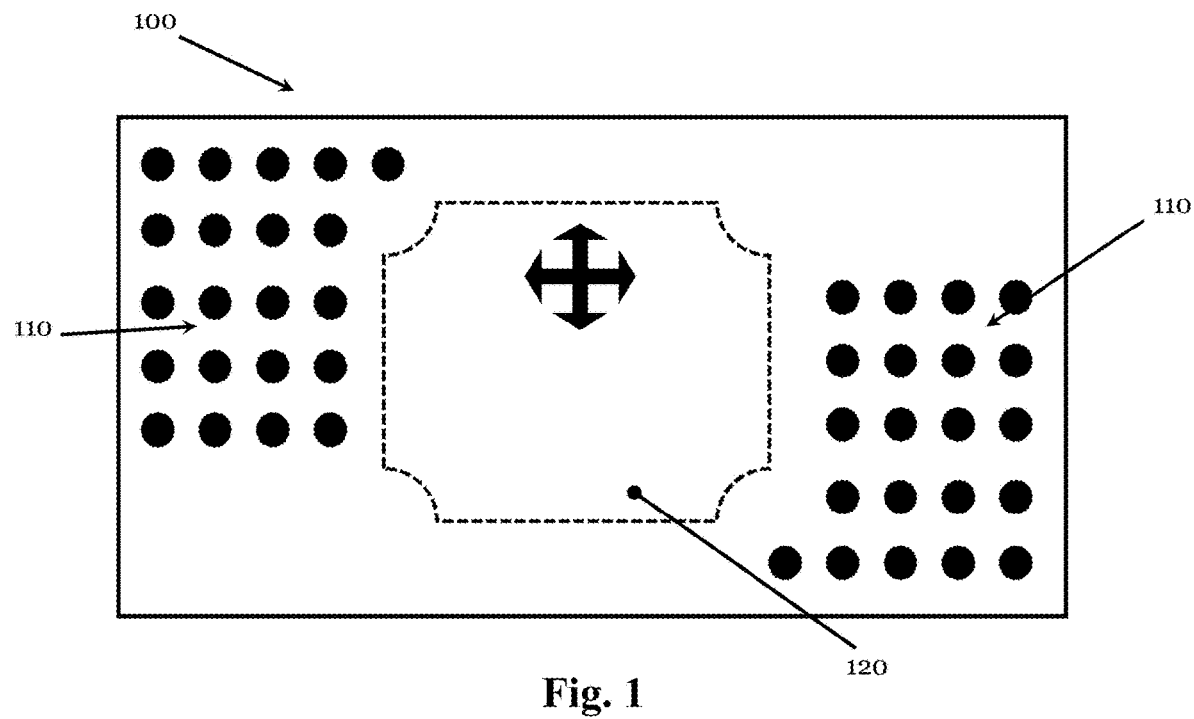
FIG. 1 is a top view of a reconfigurable mold according to certain embodiments of the present invention.

The above-mentioned problem is at least partly solved by the subject matter of the independent claims of the present application. Exemplary embodiments of the invention are described in the depended claims.

In some embodiments, the present invention provides a mold for generating a pattern of indentations in a surface of a thermoplastic textile, e.g., a non-woven fabric, the mold comprising at least one exchangeable or reconfigurable subunit adapted to create at least one subpattern of the pattern.

In essence, some embodiments of the claimed invention therefore provide a mold that can easily be reconfigured such that the generated indentation pattern can easily be adjusted to dynamically changing manufacturing requirements, for instance, in at least one of a manufacturing plant or process that is adapted for manufacturing of customized apparel. For example, the mold provided by certain embodiments of the present invention may be used for manufacturing shoe uppers that are being customized to individual customer preferences on a batch-by-batch basis or even on a piece-by-piece basis.

In some embodiments, the at least one subunit may comprise a footprint that is configured to form a tessellation, e.g. a tessellating pattern. For instance, such a mold may comprise a plurality of subunits each comprising essentially the same, in some embodiments polygonal, footprint.

In this manner, complex molding patterns may be assembled from a set of simple building blocks. In this way, the variability of the indentation patterns that may be produced by such a mold is enlarged significantly without the need to provide and store a large number of custom molds for each indentation pattern. Similar to a letterpress, a large portion of the mold can easily be adapted, changed, or partly recycled. In addition, damaged subunits can easily be replaced without having to exchange a large portion or even the complete mold.

Further, in some embodiments, the spatial arrangement of the at least one subunit is reconfigurable within the mold.

Thus, the at least one subunit of the mold can easily be rearranged with respect to other fixed or flexible portions of the mold, resulting in processed textiles featuring locally different properties as different areas might be provided with a different indentation pattern depending on a type and a location of the subunit within the mold.

In some embodiments of the present invention, the provided mold may be further adapted to fuse at least one indentation of the pattern of indentations into the thermoplastic textile by applying at least one of heat or pressure. For instance, the at least one indentation may even be fused to such degree as to be essentially transparent. Moreover, the at least one fused indentation may comprise a plurality of regularly arranged indentations. In this context and for the remainder of the present application, the term "fuse" is to be understood broadly, e.g. such that it also encompasses at least one of "emboss" or "deboss".

For instance, in some embodiments of the present invention, the at least one subunit may be adapted to provide the at least one subpattern with different at least one of mechanical or optical properties than a different portion of the pattern.

Further, the mold may be adapted to provide at least one indentation of the pattern of indentations with a minimal area of larger than or equal to 2 mm$^2$ and smaller than or equal to 30 cm$^2$, larger than or equal to 8 mm$^2$ and smaller than or equal to 20 cm$^2$, larger than or equal to 10 mm$^2$ and smaller than or equal to 5 cm$^2$, or larger than or equal to 10 mm$^2$ and smaller than or equal to 1 cm$^2$.

Moreover, the at least one subunit may comprise at least one connection element configured to connect the at least one subunit to another subunit adapted to create another subpattern of the pattern.

In this manner, different subunits of the mold can easily be joined together to form a larger portion of the mold that may be at least one of recurrently adapted or rearranged for generating even more complex and variable patterns of indentations.

Further, in some embodiments of the present invention, the provided mold may further comprise devices for heating at least one of the thermoplastic textile or a surface of the mold or a surface of the at least one subunit.

By integrating heating devices into the mold, at least one of the footprint of a molding station comprising such a mold or the molding cycle time may be reduced.

In some embodiments of the present invention, the provided mold may be further adapted to provide the at least one fused indentation with a fused outer edge region exhibiting at least one of a smoothly decreasing density, a smoothly decreasing degree of fusing, or a smoothly decreasing degree of compression.

In this manner, undesired damage that may occur at the edge of such indentations, for instance caused by a discontinuous change in material properties, may be avoided.

In certain embodiments, the present invention provides a method for generating a pattern of indentations in a surface of a thermoplastic textile, comprising the step of processing the thermoplastic textile with a mold according to any of the preceding embodiments described above.

For instance such a method may comprise at least one of the following steps: at least one of exchanging or reconfiguring at least one subunit of the mold, at least one of producing or modifying the at least one subunit with a rapid prototyping device prior to processing the thermoplastic textile, providing a separator material between the thermoplastic textile and a surface of at least one of the mold or the at least one subunit, and providing a release agent to a surface of at least one of the mold or the at least one subunit.

Such methods may allow for producing customized pieces of apparel in a fast and cost-efficient manner without the need to design custom molds every time the molding pattern is adjusted to at least one of customer requirements, changing manufacturing requirements, or new specifications.

For instance, the method may involve at least one of a processing temperature of a portion of the mold that is larger than or equal to 70° C. and smaller than or equal to 220° C., an ambient temperature that is larger than or equal to 170° C. and smaller than or equal to 190° C., a processing time that is larger than or equal to 3 s and smaller than or equal to 150 s, or a processing pressure that is larger than or equal to 0.2 bar and smaller than or equal to 5 bar.

In some embodiments, the present invention may provide a method for producing a piece of apparel, in particular a shoe, comprising the step of producing the piece of apparel using a thermoplastic textile processed according to any of the previously described methods.

In this manner the variability and flexible reconfigurability of the molds and methods described above may be fully leveraged for apparel and in particular shoe manufacturing.

Accordingly, in certain embodiments, the present invention provides a piece of apparel, in particular a shoe, comprising a thermoplastic textile processed via the method described above.

For instance, in some embodiments, such a piece of apparel may comprise a thermoplastic textile that comprises a non-woven fabric or a pre-joined composite material comprising at least one layer of melt-blown fiber non-woven fabric and at least one layer of a reinforcement textile.

Accordingly, some embodiments of the present invention provide various functional sports apparel and in particular high-performance athletic shoes that exhibit at least one of superior material, functional, haptic, or aesthetic properties or an improved wearing comfort.

For instance, such a piece of apparel may comprise at least one fused indentation, or a plurality of regularly arranged indentations, wherein the at least one indentation may further comprise an outer edge region exhibiting at least one of a smoothly decreasing density, a smoothly decreasing degree of fusing, or a smoothly decreasing degree of compression.

In this manner, undesired at least one of damaged, wear, or material degradation that may occur at the edge of such indentation, for instance caused by a discontinuous change in material properties, may be avoided.

In some embodiments, the present invention provides a system for processing a thermoplastic textile, comprising: a mold according to any of the above embodiments and devices for at least one of exchanging or reconfiguring the at least one exchangeable and/or reconfigurable subunit.

For instance, in such systems the device for at least one of exchanging or reconfiguring the at least one subunit may be a robotic actuator configured to grip and translate the at least one exchangeable or reconfigurable subunit.

In this manner, the complete reconfiguration process of at least one of the mold or the at least one subunit may be partially or even fully automated leading to at least one of faster cycle times or an increased reliability for manufacturing of customized apparel such as customized athletic shoes.

In various embodiments of the present invention, such a system for processing a thermoplastic textile may further comprise at least one of: devices for automatically providing the thermoplastic textile to be processed, devices for heating the mold, the at least one exchangeable or reconfigurable subunit and/or the thermoplastic textile being processed, devices for storing a plurality of exchangeable or reconfigurable subunits, rapid prototyping devices for at least one of producing or modifying the at least one exchangeable or reconfigurable subunit on demand during system operation, devices for providing a separator material between at least one of the thermoplastic textile and the mold or between the thermoplastic textile and the at least one exchangeable or reconfigurable subunit, and devices for providing a release agent to at least one of a surface of the mold or a surface of the at least one exchangeable or reconfigurable subunit.

Depending on the specific implementation of the provided system, various aspects of manufacturing of customized apparel can further be at least one of enhanced or further automated. In essence, the provided system thereby allows for fully automated and thus fast and low-cost manufacturing of customized apparel and shoes.

The various embodiments of the present invention can also be at least one of used with or applied on other types of thermoplastic materials such as films, foams, or various other materials used in at least one of footwear or apparel manufacturing.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, exemplary embodiments of the present invention are described in more detail, with reference to a mold for processing thermoplastic textiles. While specific feature combinations are described in the following with respect to the exemplary embodiments of the present invention, it is to be understood that the disclosure is not limited to such embodiments. In particular, not all features have to be present for realizing certain embodiments of the invention, and the embodiments may be modified by combining one or more features of certain embodiments.

While certain embodiments of the present invention are described in the following paragraphs with respect to molds, methods, and systems that are adapted to provide indentation into a thermoplastic textile, it should be appreciated that the same molds, methods, and systems can also be used to provide perforations into at least one of such textiles or other thermoplastic materials used in apparel and sports goods manufacturing such as at least one of films or foams.

FIG. 1 depicts a mold 100 for processing of thermoplastic textiles, e.g., thermoplastic non-woven fabrics, according to certain embodiments of the present invention. The mold 100 may comprise a plurality of fixed molding features 110 that may be configured to provide indentations to a textile processed with the mold 100. In addition, the mold 100 may be configured to comprise at least one exchangeable or reconfigurable subunit 120. The subunit 120 may be adapted to be at least one of reconfigurable, exchangeable, or movable with respect to at least one of the mold 100 or at least one fixed molding feature 110. In some embodiments, the mold 100 may comprise at least one preconfigured reception position for the at least one reconfigurable subunit 120. For instance, the mold 100 may comprise an at least partially heat-resistant material such as a polymer, a metal, etc.

Figure 2:
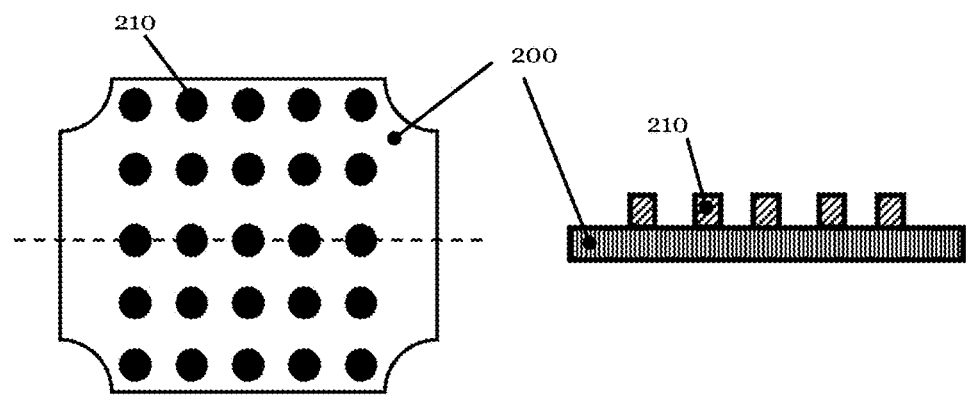
FIG. 2 is a diagram illustrating a reconfigurable subunit of a reconfigurable mold according to certain embodiments of the present invention.

FIG. 2 depicts an illustration of a reconfigurable subunit 200. A subunit 200 of this sort may be used alone to imprint a single localized pattern on a textile. Alternatively, a subunit 200 of this sort may be combined with additional identical or similar subunits to imprint a repeating pattern on a textile covering a larger area than may be achieved with a single subunit in a single step. The benefit of this arrangement is that the coverage of a repeating pattern may be adapted depending on the size of the textile. This is especially useful in the manufacture of garments and apparel where multiple sizes of the same product have to be made in order to suit different wearers. Alternatively, a subunit 200 of this sort may be combined with additional alternative subunits, e.g., subunits having at least one of a different size, a different shape, and/or a different pattern. The benefit of this arrangement is that larger complex patterns may be built up in a modular manner from small individual pieces. This allows increased design freedom without overly extending the resources available from a manufacturing point of view. Alternatively, or in combination with any of the assembly options above, a subunit 200 of this type may be used together with the mold 100 of FIG. 1. The illustration on the left of FIG. 2 depicts a top view on the subunit 200 while the illustration on the right depicts a cut through the subunit along the dashed line in the illustration on the left of FIG. 2. The subunit 200 may comprise a plurality of molding features 210 that may be configured to generate a pattern or subpattern of indentations in a thermoplastic textile that is being processed, e.g. molded, by a mold comprising the subunit 200 or a mold comprising a plurality of identical or similar subunits as discussed in more detail below.

The subunit 200 may be arranged in a reconfigurable manner on the surface simply using gravity to keep the subunit 200 in place. Alternatively when there is no mold or other external frame to hold the subunit 200 in place, it may be necessary to attach the subunit 200 to the surface to prevent the subunit from moving during use or between repeated uses. The subunit 200 may be attached to the surface using, for example, a clamp, a screw mechanism, a clip mechanism, or a magnetic fastening mechanism. Moreover, different subunits 200 having different patterns of molding features 210 may be used together with the mold 100. In some embodiments, the molding features 210 are illustrated as a regular pattern of protrusions. However, in other embodiments the subunit 200 may also comprise recesses or both.

Further, the subunit 200 may be constructed from the same heat-resistant material as the mold 100 or may comprise a different material that is adapted to provide a textile being processed with a pattern of indentations. For example, the subunit 200 may be manufactured on demand by a rapid prototyping device such as a 3D printer, a laser sintering device, or a multi-jet-fusion device. In this manner, the molding pattern of the mold 100 may easily be reconfigured, either by at least one of changing the position of the subunit 200 with respect to the surface of the mold or replacing the subunit 200 by a different one, for instance, being produced on demand by a 3D printer according to individual customer preferences.

Further, at least one of the mold 100 of FIG. 1 or the subunit 200 may comprise a heating device such as an electric heating element or channels for providing a heating medium. In this manner, the molding features 110 and 210 may be heated to a temperature that is sufficient to provide a thermoplastic textile, e.g. a non-woven fabric, with heat-fused indentations when being processed via at least one of the mold or the subunit 200. In other embodiments, the heat required for heat-fusing the textiles being processed by at least one of the mold 100 or the subunit 200 may also be supplied via an external heating device that is not incorporated in the mold 100 or the subunit 200.

The subunit 200 may also comprise a heat conductive material in order to apply heat and pressure at the same time to the thermoplastic textile being processed. Alternatively or additionally, the textile could be heated. The first option gives the benefit that it does not require heating a larger region or volume so that the whole molding arrangement is heated together. The second option gives faster cycle times of the process since the subunit 200 does not have to be heated after having cooled down.

Figure 3:
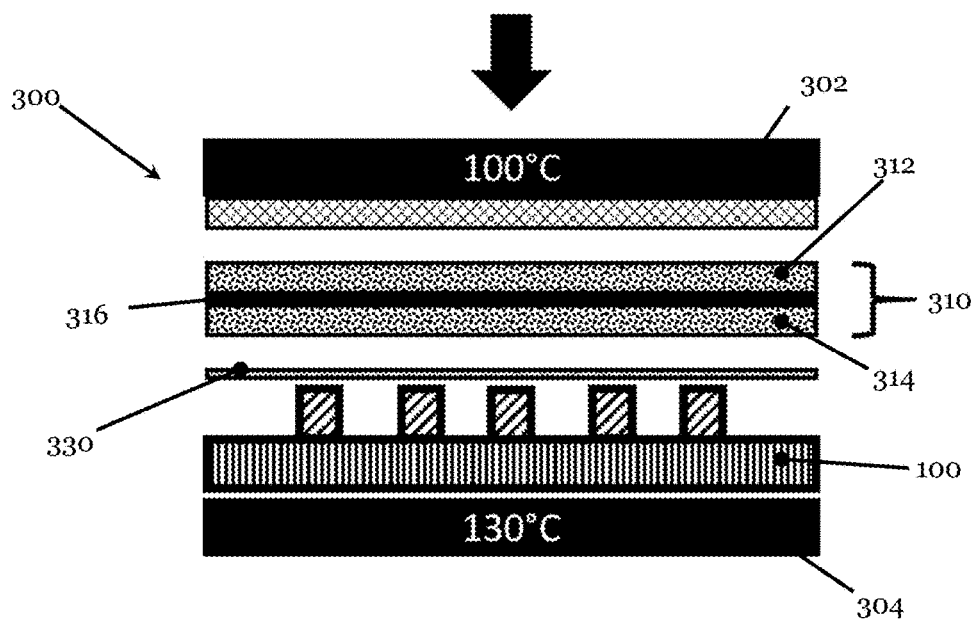
FIG. 3 is a diagram illustrating a molding station for processing a thermoplastic textile using a reconfigurable mold according to certain embodiments of the present invention.

FIG. 3 depicts an exemplary illustration of a molding station or heat press 300 for processing a textile according to certain embodiments of the present invention. Such a heat press/molding station 300 may also be used for carrying out any of the methods provided by the present disclosure. As depicted in FIG. 3 the molding station 300 may comprise an upper portion 302 and a lower portion 304 that may be heated, e.g. via integrated heating devices, to elevated temperatures required for processing a thermoplastic textile 310. The lower portion 304 of the molding station/heat press 300 may be equipped with a reconfigurable mold 100, comprising one or a plurality of reconfigurable subunits 200 as depicted in FIG. 2 and discussed above.

In general, heat and pressure do not have to be applied at the same time. For example, in some embodiments the thermoplastic textile may first be heated above a threshold temperature that allows the thermoplastic textile to be plastically deformed and afterwards pressure is applied via at least one of a mold 100 or a molding station 300 to cause such a desired deformation (e.g. fusing) of the thermoplastic textile.

In some examples, the textile being processed by the mold 100 is a three-layer sandwich textile comprising an upper layer 312 and a lower layer 314 of melt-blown fiber non-woven fabric that may be directly deposited, e.g. melt-blown, onto a middle layer of reinforcement textile 316. For instance, both layers of melt-blown fiber non-woven fabrics 312, 314 may comprise a thermoplastic polymer such as thermoplastic polyurethane (TPU). Other suitable thermoplastic polymers include thermoplastic polyamides, polyethylene terephthalate, thermoplastic copolyester, polyether block amide, and other thermoplastic elastomers. In this way, the different properties offered by these materials may be optimally utilized for tuning the properties of the non-woven fabric layers 312, 314.

In some embodiments of the present invention, the thermoplastic textile 310 is not directly brought in contact with the molding features of the mold 100. Instead, a separator material 330 such as a thin layer of at least one of polytetrafluoroethylene or silicone may be used to facilitate an easy removal of the textile 310 after molding. Alternatively or additionally, a chemical or a physical removal agent may be employed to facilitate removing the molded textile 310 after molding.

Figure 4:
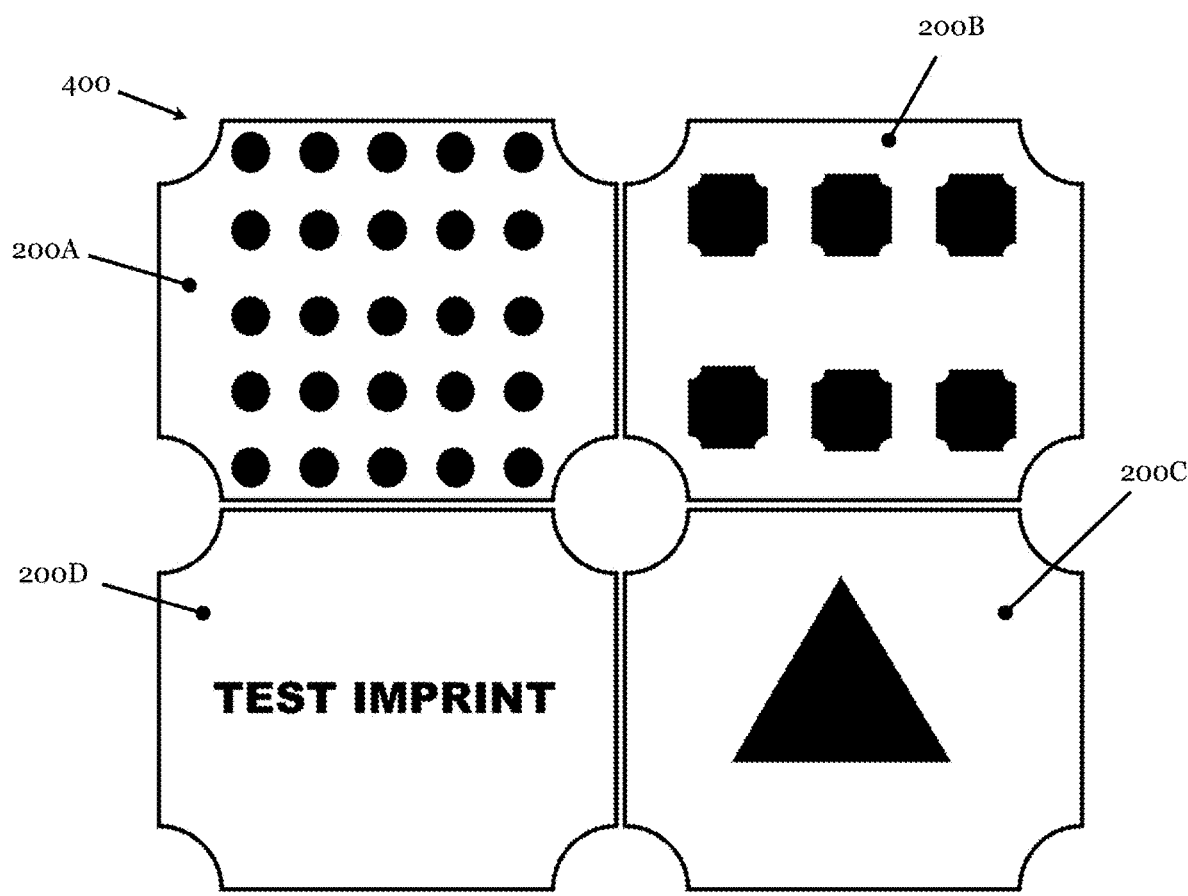
FIG. 4 is a top view of a molding arrangement formed by a plurality of reconfigurable mold subunits according to certain embodiments of the present invention.

FIG. 4 depicts a mold 400 for processing a thermoplastic textile with at least one of a process or molding station as depicted in FIG. 3. The mold 400 is formed by a regular arrangement of four reconfigurable/exchangeable subunits 200A-200D that comprise an identical footprint but different patterns of molding features. In this way, a mold having complex molding patterns may be assembled from a plurality of simple subunits 200. In some embodiments, the footprint of the subunits 200 is configured to tessellate, e.g., form a mosaic-like arrangement. For instance, the footprint of the subunits 200 may comprise a polygonal shape such as a hexagon. In this case, a portion of a mold such as the mold 100 of FIG. 1 and FIG. 3 may be covered, essentially without leaving non-covered spaces, via assembling a tessellation, e.g., a tessellating pattern comprising many subunits 200 having the same footprint.

Figure 5:
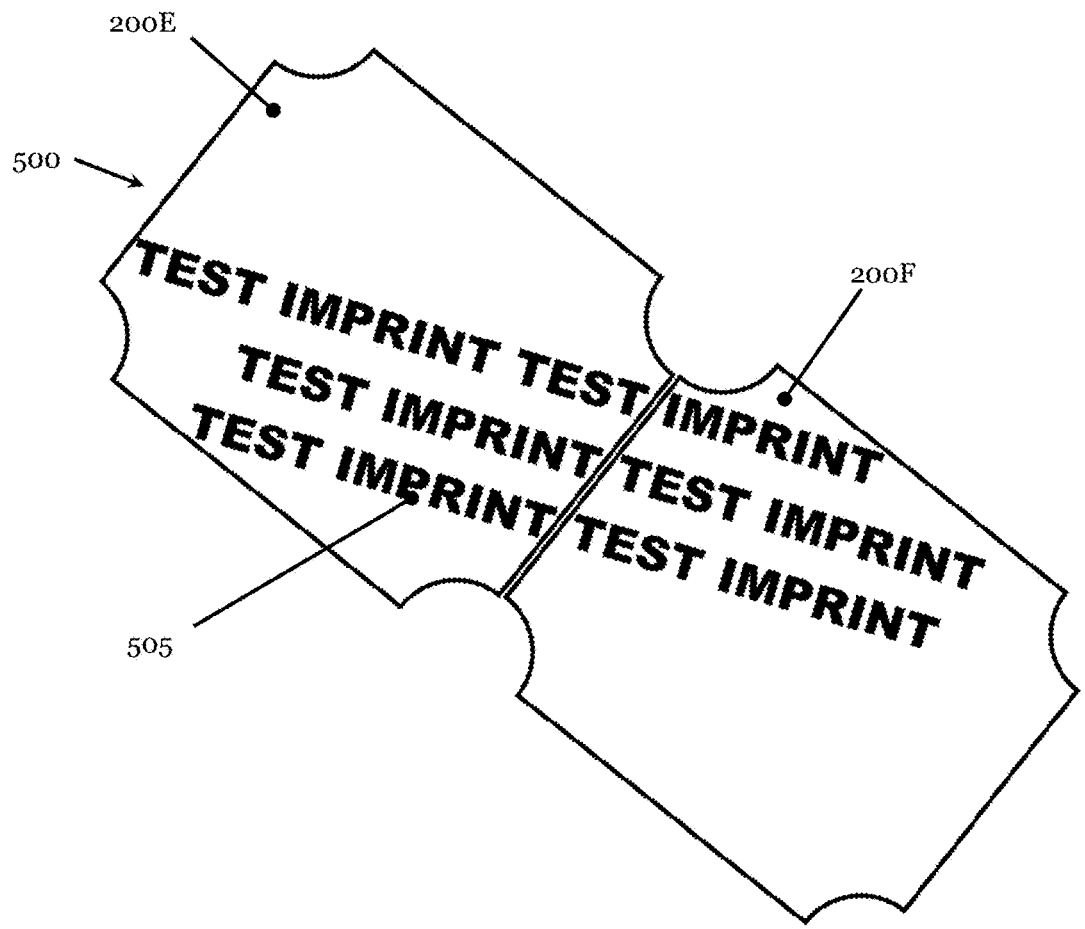
FIG. 5 is a top view of a molding arrangement formed by a plurality of reconfigurable mold subunits according to certain embodiments of the present invention.

FIG. 5 depicts certain embodiments of the present invention, wherein the molding features of at least two subunits 200E and 200F are not identical but configured to form a mold 500 having a common pattern 505 of molding features. In this way, the subunits 200 may be arranged such that the textile being processed by the mold 500 may be provided with a common and coherent pattern of indentations corresponding to the common pattern 505 of molding features.

Figure 6:
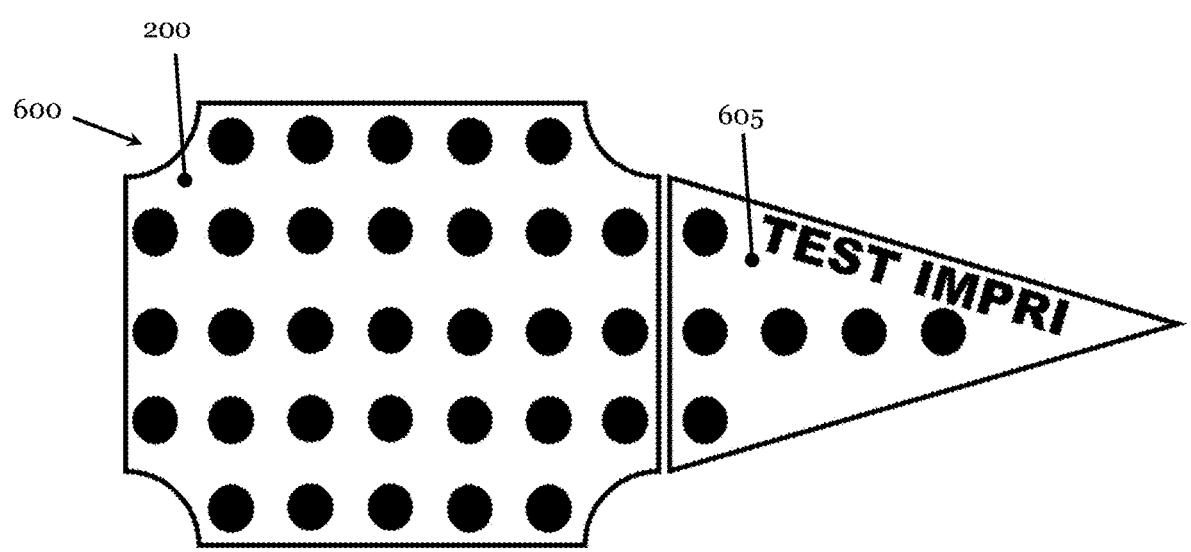
FIG. 6 is a top view of a molding arrangement formed by a plurality of reconfigurable mold subunits according to certain embodiments of the present invention.

FIG. 6 depicts certain embodiments of the present invention, wherein at least two subunits 200 and 605 of different footprints may be combined to create a mold 600 comprising a coherent common pattern of molding features. Some embodiments may be particularly relevant for processing thermoplastic textiles with an asymmetric shape such as a shoe upper.

Figure 7:
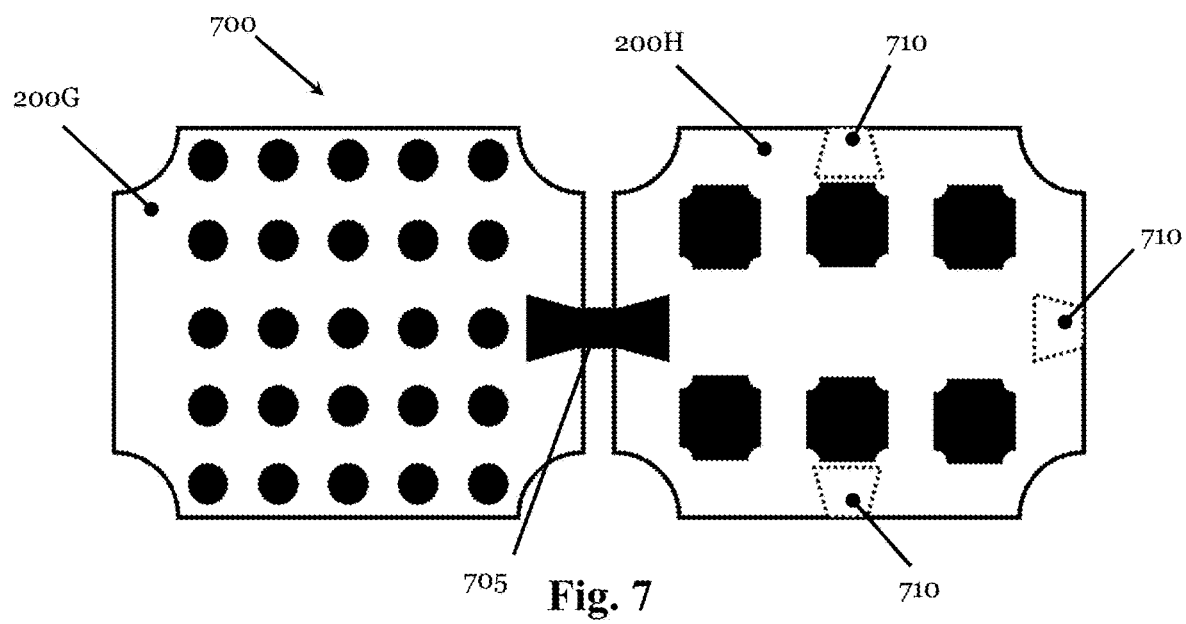
FIG. 7 is a diagram illustrating a connection technique for a molding arrangement formed by a plurality of reconfigurable mold subunits according to certain embodiments of the present invention.

FIG. 7, according to certain embodiments, shows how the subunits 200G and 200H of a mold 700 may be provided with connection elements 705 that may be configured to fit into corresponding connection recesses 710 arranged at the edges of the subunits 200G and 200H of the mold 700. In some embodiments, there may be alternative connection elements or connection mechanisms such as magnetic connection devices. Depending on the application, the connection mechanism provided by the connection elements 705 may be reversible or irreversible.

Figure 8:
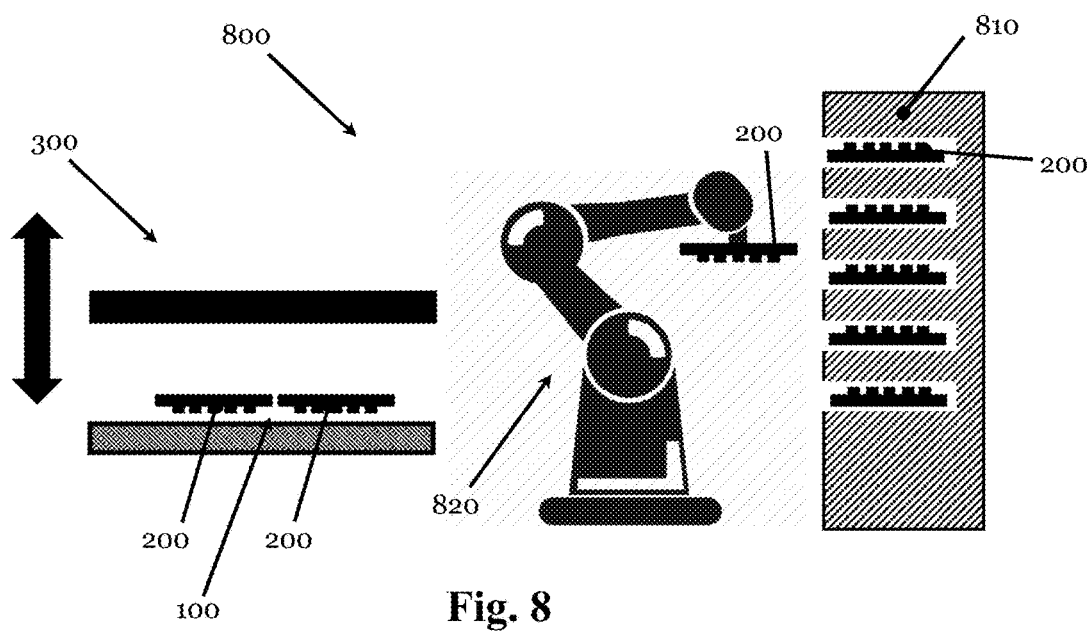
FIG. 8 is a diagram illustrating a system for processing a thermoplastic textile according to certain embodiments of the present invention.

FIG. 8 depicts an exemplary system 800 for processing a thermoplastic textile according to certain embodiments of the present invention. The system 800 may comprise storage device 810 for storing a plurality of subunits 200 as described above. The system 800 may further comprise a robotic actuator 820 configured for retrieving the subunits 200 from the storage device 810 and for assembling a mold 100 from several of the reconfigurable subunits 200. The assembled mold 100 can then be used in a molding station 300 for processing the thermoplastic textile as described above with reference to FIG. 3. In addition, the system may further comprise devices for automatically providing and retrieving the thermoplastic textile 310 as well as a rapid prototyping facility for at least one of repairing, modifying, or producing customized subunits 200 on demand.

Figure 9:
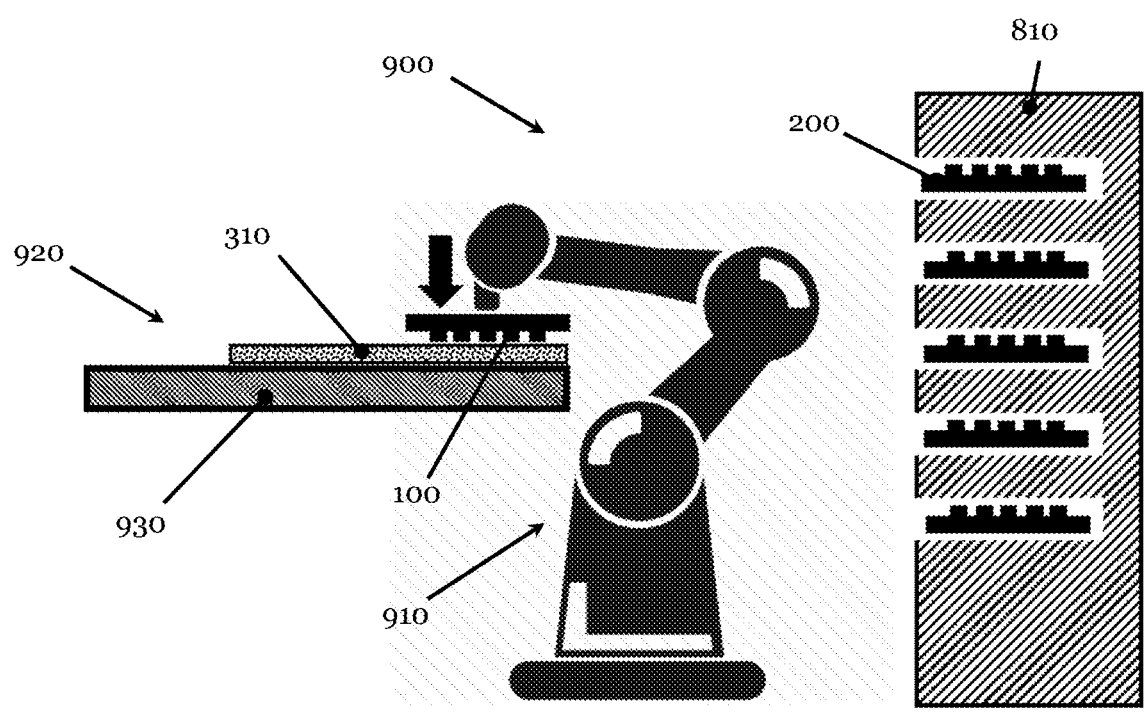
FIG. 9 is a diagram illustrating a system for processing a thermoplastic textile according to certain embodiments of the present invention.

FIG. 9 depicts another exemplary system 900 according to certain embodiments of the present invention. Similar to some embodiments of FIG. 8 above, the system 900 comprises storage device 810 for storing a plurality of subunits 200 as well as a robotic actuator 910 and a molding station 920. In some embodiments the robotic actuator 910 is adapted to retrieve one or several subunits 200 from the storage device 810, for instance via a special actuator head comprising a plurality of reception elements for a plurality of subunits 200. In addition, the robotic actuator 910 may be further adapted to directly mold the thermoplastic textile 310, e.g. via applying a downward pressure onto the textile 310. In some embodiments, the heat required for providing the thermoplastic textile 310 with heat-fused indentations may be provided by heating devices integrated into at least one of the subunits 200, the head of the robotic actuator 910, or a counter plate 930 that is used for molding the textile 310. In some embodiments, the mold 100 may be assembled from a plurality of subunits 200 at a different location. The robotic actuator 910 may then retrieve the assembled mold 100 and use it for processing the textile 310. In this manner, a new mold for a new textile can already be assembled by the system while the preceding textile is being processed by the preceding mold 100.

In some embodiments of the present invention the storage device 810 of FIG. 8 and FIG. 9 may be configured to operate as at least one of a heater or as an oven for the plurality of subunits 200.

In certain embodiments of the present invention, a molding subunit such as the subunit 200 of FIG. 2 may be translated and rotated in space (e.g. by a robotic actuator similar to at least one of the robotic actuator 820 of FIG. 8 or the robotic actuator 910 of FIG. 9) such that it may be applied (e.g. pressed onto) in various orientations to different areas of at least one of a thermoplastic textile or similar thermoplastic material for the purpose of at least one of compacting or fusing the respective area the subunit is applied to. The possibility of rotating the subunit with respect to the thermoplastic textile/material provides an additional degree of freedom that allows the subunit to generate indentation patterns with an even larger degree of variation.

For instance, the thermoplastic textile/thermoplastic material may be an upper of a shoe and the subunit may be translated and rotated such that different areas on the upper are at least one of compacted or fused when the subunit is pressed onto the respective area of the upper. For this purpose, the subunit may comprise a variety of at least one of different shapes and/or molding patterns that, for example, may be generated on demand by at least one of an additive manufacturing device or computer-controlled laser cutter.

In the following, further examples are described to facilitate the understanding of the invention:

Example 1

Mold (100, 400, 500, 600, 700) for generating a pattern of indentations in a surface of a thermoplastic textile (310), preferably comprising a non-woven fabric, comprising at least one exchangeable and/or reconfigurable subunit (200) adapted to create at least one subpattern of the pattern.

Example 2

Mold (100, 400, 500, 600, 700) according to the preceding example, wherein the at least one subunit (200) comprises a footprint that is configured to form a tessellation.

Example 3

Mold (100, 400, 500, 600, 700) according to any of the preceding examples, comprising a plurality of subunits (200) each comprising essentially the same, preferably polygonal, footprint.

Example 4

Mold (100, 400, 500, 600, 700) according to any of the preceding examples, wherein the spatial arrangement of the at least one subunit (200) is reconfigurable within the mold (100, 400, 500, 600, 700).

Example 5

Mold (100, 400, 500, 600, 700) according to any of the preceding examples, further adapted to fuse at least one indentation of the pattern of indentations into the thermoplastic textile (310) by applying heat and/or pressure.

Example 6

Mold (100, 400, 500, 600, 700) according to the preceding example, wherein the at least one fused indentation comprises a plurality of regularly arranged indentations.

Example 7

Mold (100, 400, 500, 600, 700) according to any of the preceding examples, wherein the at least one indentation is essentially transparent.

Example 8

Mold (100, 400, 500, 600, 700) according to any of the preceding examples, further adapted to provide at least one indentation of the pattern of indentations with a minimal area of larger than or equal to 2 $mm^2$ and smaller than or equal to 30 $cm^2$, preferably larger than or equal to 8 $mm^2$ and smaller than or equal to 20 $cm^2$, more preferably larger than or equal to 10 $mm^2$ and smaller than or equal to 5 $cm^2$ and most preferably larger than or equal to 10 $mm^2$ and smaller than or equal to 1 $cm^2$.

Example 9

Mold (100, 400, 500, 600, 700) according to any of the preceding examples, wherein the at least one subunit (200, 200G) comprises at least one connection element (700) configured to connect the at least one subunit (200G) to another subunit (200H) adapted to create another subpattern of the pattern.

Example 10

Mold (100, 400, 500, 600, 700) according to any of the preceding examples, wherein the at least one subunit (200) is adapted to provide the at least one subpattern with different mechanical and/or optical properties than a different portion of the pattern.

Example 11

Mold (100, 400, 500, 600, 700) according to any of the preceding examples, further comprising means for heating the thermoplastic textile (310) and/or a surface of the mold (100, 400, 500, 600, 700) and/or a surface of the at least one subunit (200).

Example 12

Mold (100, 400, 500, 600, 700) according to any of the preceding examples 5-11, configured to provide the at least one fused indentation with a fused outer edge region exhibit a smoothly decreasing density, smoothly decreasing degree of fusing and/or a smoothly decreasing degree of compression.

Example 13

Method for generating a pattern of indentations in a surface of a thermoplastic textile (310), comprising the step of processing the thermoplastic textile (310) with a mold (100, 400, 500, 600, 700) according to any of the preceding examples.

Example 14

Method according to the preceding example, further comprising at least one of the following steps:
  a. exchanging and/or reconfiguring at least one subunit (200) of the mold (100, 400, 500, 600, 700);
  b. producing and/or modifying the at least one subunit (200) with a rapid prototyping device prior to processing the thermoplastic textile (310);
  c. providing a separator material (330) between the thermoplastic textile (310) and a surface of the mold (100, 400, 500, 600, 700) and/or the at least one subunit (200); and
  d. providing a release agent to a surface of the mold (100, 400, 500, 600, 700) and/or the at least one subunit (200).

Example 15

Method according to any of the preceding examples 13 or 14: wherein
  a. a processing temperature of a portion of the mold (100, 400, 500, 600, 700) is larger than or equal to 70° C. and smaller than or equal to 220° C.; and/or
  b. an ambient temperature is larger than or equal to 170° C. and smaller than or equal to 190° C.; and/or
  c. a processing time is larger than or equal to 3 s and smaller than or equal to 150 s; and/or
  d. a processing pressure is larger than or equal to 0.2 bar and smaller than or equal to 5 bar.

Example 16

Method for producing a piece of apparel, in particular a shoe, comprising the step of: producing the piece of apparel using a thermoplastic textile (310) processed according to the method of any of the preceding examples 13-15.

Example 17

Piece of apparel, in particular a shoe, comprising a thermoplastic textile (310) processed via the method of any of the preceding examples 13-16.

Example 18

Piece of apparel according to the preceding example, wherein the thermoplastic textile (310) comprises a non-woven fabric or a pre-joined composite material comprising at least one layer (312, 314) of melt blown non-woven fabric and at least one layer of a reinforcement textile (316).

Example 19

Piece of apparel according to any of the preceding examples 17 or 18, comprising at least one fused indentation, preferably a plurality of regularly arranged indentations.

Example 20

Piece of apparel according to any of the preceding examples 17-19, wherein the at least one indentation comprises an outer edge region exhibit a smoothly decreasing density, smoothly decreasing degree of fusing and/or a smoothly decreasing degree of compression.

Example 21

System (800, 900) for processing a thermoplastic textile (310), comprising:
  a. a mold (100, 400, 500, 600, 700) according to any of the preceding examples 1-12; and
  b. means (820, 910) for exchanging and/or reconfiguring the at least one exchangeable and/or reconfigurable subunit (200).

Example 22

System (800, 900) for processing a thermoplastic textile (310) according to the preceding example, wherein the means (820, 910) for exchanging and/or reconfiguring the at least one subunit (200) comprise a robotic actuator configured to grip and translate the at least one exchangeable and/or reconfigurable subunit (200).

Example 23

System (800, 900) for processing a thermoplastic textile (310) according to any of the preceding examples 21 or 22, further comprising at least one of:
  a. means for automatically providing the thermoplastic textile (310) to be processed;
  b. means for heating the mold (100, 400, 500, 600, 700), the at least one exchangeable and/or reconfigurable subunit (200) and/or the thermoplastic textile (310) being processed;
  c. means for storing (810) a plurality of exchangeable and/or reconfigurable subunits (200);
  d. rapid prototyping means for producing and/or modifying the at least one exchangeable and/or reconfigurable subunit (200) on demand prior/or during system operation;
  e. means for providing a separator material (330) between the thermoplastic textile (310) and a surface of the mold (100, 400, 500, 600, 700) and/or between the thermoplastic textile (310) and a surface of the at least one exchangeable and/or reconfigurable subunit (200); and
  f. means for providing a release agent to a surface of the mold (100, 400, 500, 600, 700) and/or a surface of the at least one exchangeable and/or reconfigurable subunit (200).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for generating a pattern of indentations in a surface of a thermoplastic textile, the method comprising:
   processing the thermoplastic textile with a mold comprising a first subunit comprising:

a base; and
    at least one molding feature extending into the base, from the base, or a combination thereof and adapted to create a subpattern of the pattern;
    wherein the first subunit is exchangeable;
    wherein the base forms a footprint of the first subunit; and
    wherein the footprint of the first subunit is different than a shape of the at least one molding feature;
fusing an indentation of the pattern of indentations into the thermoplastic textile by applying heat and pressure; and
exchanging the first subunit with a second subunit, wherein the footprint of the first subunit is different than a footprint of the second subunit.

2. The method according to claim 1, further comprising producing or modifying the first subunit with a rapid prototyping device prior to processing the thermoplastic textile.

3. The method according to claim 1, further comprising at least one of:
- a processing temperature of a portion of the mold is larger than or equal to 70° C. and smaller than or equal to 220° C.;
- a processing time is larger than or equal to 3 s and smaller than or equal to 150 s; or
- a processing pressure is larger than or equal to 0.2 bar and smaller than or equal to 5 bar.

4. The method according to claim 1, comprising forming a piece of apparel using the thermoplastic textile, wherein the piece of apparel comprises a shoe.

5. The method according to claim 4, wherein the thermoplastic textile comprises a non-woven fabric or a pre-joined composite material, wherein the non-woven fabric or the pre-joined composite material comprises a layer of melt blown non-woven fabric, and wherein the piece of apparel comprises the fused indentation.

6. The method according to claim 5, wherein the fused indentation comprises an outer edge region comprising at least one of a uniformly decreasing density, a uniformly decreasing degree of fusing, or a uniformly decreasing degree of compression.

7. The method according to claim 1, wherein at least one of a size or a shape of the footprint of the first subunit is different than at least one of a size or a shape of the footprint of the second subunit.

8. The method according to claim 1, further comprising exchanging the first subunit using a robotic actuator configured to grip and translate the first subunit and the second subunit.

9. The method according to claim 1, further comprising incorporating a third subunit to form a tessellating pattern with the first subunit and the third subunit.

10. The method according to claim 9, further comprising connecting, via a connection element, the first subunit to the third subunit to create an additional subpattern of the pattern.

11. The method according to claim 1, wherein the indentation of the pattern of indentations has a minimal area of larger than or equal to 2 mm$^2$ and smaller than or equal to 30 cm$^2$.

12. The method according to claim 1, wherein the indentation of the pattern of indentations is substantially transparent.

13. The method according to claim 1, wherein the first subunit is adapted to provide the subpattern with different properties than a different portion of the pattern, wherein the different properties comprise at least one of a mechanical property or an optical property.

14. The method according to claim 1, further comprising at least one of:
- inserting a separator material between the thermoplastic textile and at least one of a surface of the mold or a surface of the first subunit; or
- applying a release agent to at least one of the surface of the mold or the surface of the first subunit.

15. A method for generating a pattern of indentations in a surface of a thermoplastic textile, the method comprising:
processing the thermoplastic textile with a mold comprising a subunit comprising:
    a base; and
    at least one molding feature extending into the base, from the base, or a combination thereof and adapted to create a subpattern of the pattern;
    wherein the subunit is reconfigurable;
    wherein the base forms a footprint of the subunit; and
    wherein the footprint of the subunit is different than a shape of the at least one molding feature;
fusing an indentation of the pattern of indentations into the thermoplastic textile by applying heat and pressure; and
reconfiguring a spatial arrangement of the footprint of the subunit within the mold from a first spatial arrangement to a second spatial arrangement, wherein the first spatial arrangement is different from the second spatial arrangement.

16. The method according to claim 15, further comprising forming a piece of apparel using the thermoplastic textile, wherein the piece of apparel comprises a shoe.

17. The method according to claim 15, further comprising reconfiguring the subunit using a robotic actuator configured to grip and translate the subunit.

18. The method according to claim 15, wherein the indentation of the pattern of indentations is substantially transparent.

19. The method according to claim 15, wherein the subunit is adapted to provide the subpattern with different properties than a different portion of the pattern, wherein the different properties comprise at least one of a mechanical property or an optical property.

20. The method according to claim 15, further comprising at least one of:
- inserting a separator material between the thermoplastic textile and at least one of a surface of the mold or a surface of the subunit; or
- applying a release agent to at least one of the surface of the mold or the surface of the subunit.

* * * * *